(12) United States Patent
Fukazawa

(10) Patent No.: US 8,873,886 B2
(45) Date of Patent: Oct. 28, 2014

(54) APPARATUS AND METHOD FOR DISPLAYING A REGION OF AN IMAGE IN AN ENLARGED MANNER, AND PROGRAM THEREFOR

(75) Inventor: Kentaro Fukazawa, Tokyo (JP)

(73) Assignee: Sony Corporation (JP)

( * ) Notice: Subject to any disclaimer, the term of this patent is extended or adjusted under 35 U.S.C. 154(b) by 126 days.

(21) Appl. No.: 13/597,671

(22) Filed: Aug. 29, 2012

(65) Prior Publication Data

US 2013/0064473 A1 Mar. 14, 2013

(30) Foreign Application Priority Data

Sep. 9, 2011 (JP) ................................. 2011-197180

(51) Int. Cl.
- *G06K 9/32* (2006.01)
- *G06F 3/0484* (2013.01)
- *G06F 3/0481* (2013.01)
- *G06T 3/00* (2006.01)

(52) U.S. Cl.
CPC .......... *G06T 3/0012* (2013.01); *G06F 3/04845* (2013.01); *G06F 2203/04806* (2013.01); *G06F 3/04812* (2013.01)
USPC ....................................................... 382/298

(58) Field of Classification Search
None
See application file for complete search history.

(56) References Cited

U.S. PATENT DOCUMENTS

| | | | | |
|---|---|---|---|---|
| 7,373,004 B2* | 5/2008 | Chang et al. | ................... | 382/236 |
| 2005/0084007 A1* | 4/2005 | Lightstone et al. | ...... | 375/240.03 |
| 2009/0040238 A1* | 2/2009 | Ito et al. | ......................... | 345/660 |
| 2010/0225646 A1* | 9/2010 | Wei et al. | ....................... | 345/419 |
| 2012/0092494 A1* | 4/2012 | Garoutte et al. | .............. | 348/143 |
| 2012/0092501 A1* | 4/2012 | Chu | ............................. | 348/159 |

FOREIGN PATENT DOCUMENTS

| | | |
|---|---|---|
| JP | 11-306374 A | 11/1999 |
| JP | 2001-142602 A | 5/2001 |

* cited by examiner

*Primary Examiner* — Li Liu

(74) *Attorney, Agent, or Firm* — Lerner, David, Littenberg, Krumholz & Mentlik, LLP

(57) ABSTRACT

Provided is an image processing apparatus, including an enlargement ratio setting section which sets a region of data in an original image, including a designated position designated as an object to be enlarged within the original image, as a region to be enlarged, and sets an enlargement ratio to the region to be enlarged, based on an image feature amount showing complexity of an image of the region to be enlarged, and an enlarged image generation section which generates enlarged image data for the data of the original image, by applying an enlargement process by the enlargement ratio set by the enlargement ratio setting section.

9 Claims, 14 Drawing Sheets

FIG. 6
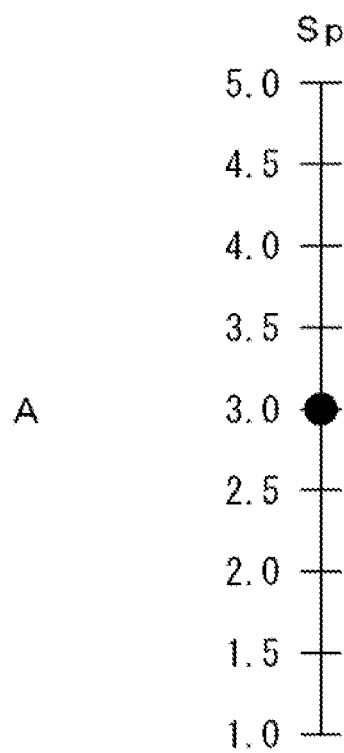
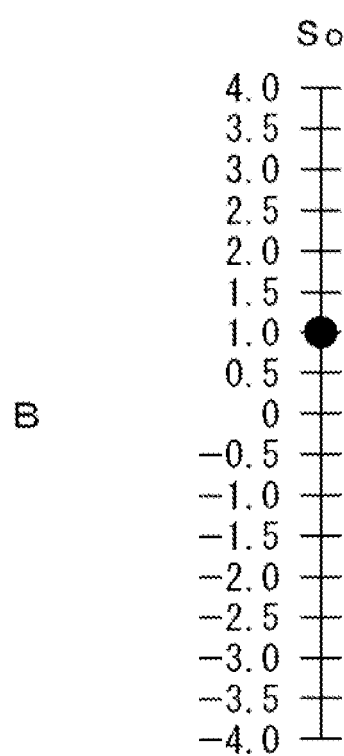

FIG. 7
A
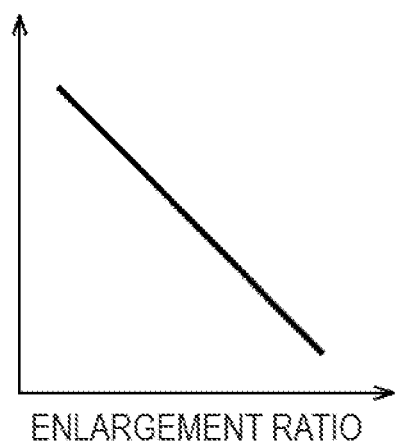
MOVING SPEED OF
MOUSE CURSOR
ENLARGEMENT RATIO
B
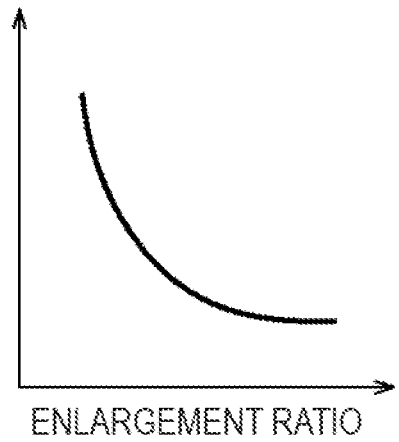
MOVING SPEED OF
MOUSE CURSOR
ENLARGEMENT RATIO

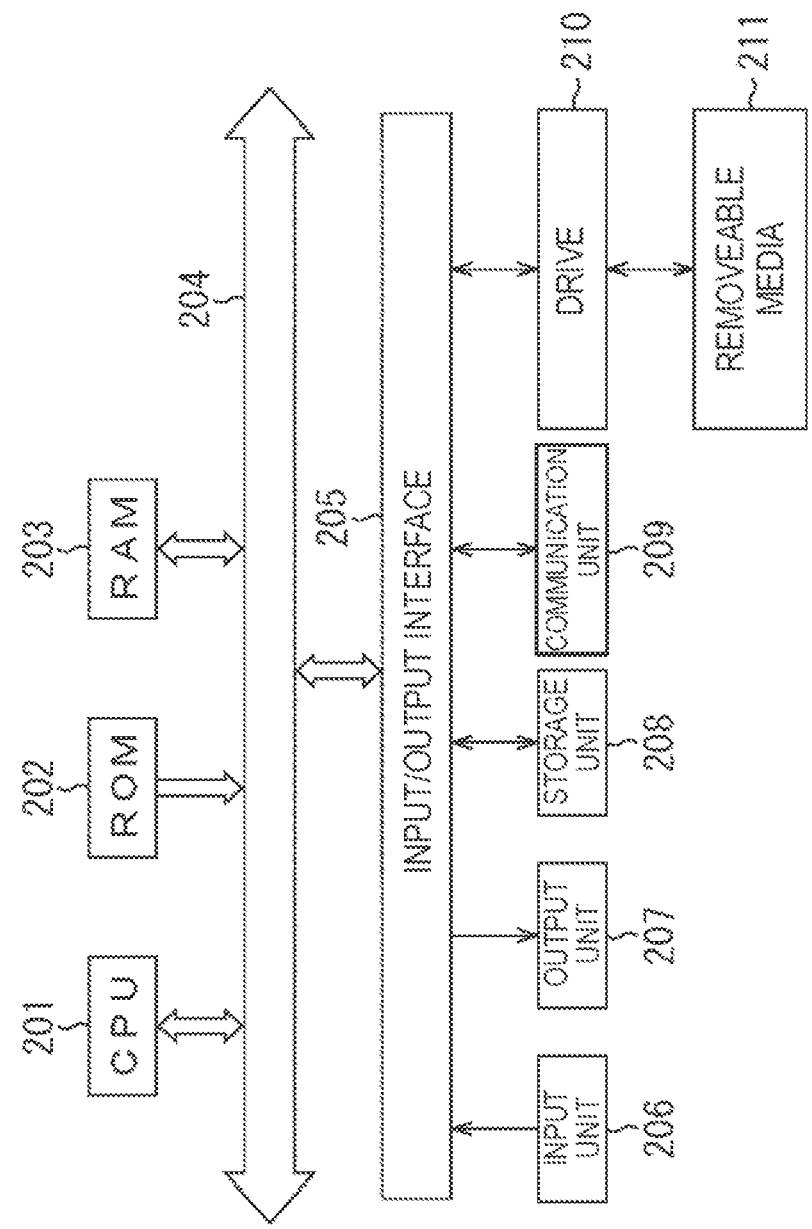

APPARATUS AND METHOD FOR DISPLAYING A REGION OF AN IMAGE IN AN ENLARGED MANNER, AND PROGRAM THEREFOR

CROSS-REFERENCE TO RELATED APPLICATION

The present application claims priority from Japanese Patent Application No. JP 2011-197180 filed in the Japanese Patent Office on Sep. 9, 2011, the entire content of which is incorporated herein by reference.

BACKGROUND

The present disclosure relates to an image processing apparatus, method and program, and more specifically to an image processing apparatus, method and program that can display a region of an image in an enlarged manner, with an appropriate magnification depending on the complexity of the image.

In the past, in the case where an image is confirmed in an image processing device or the like, a reduced image of the original image is displayed so as to improve the visibility of the entire image.

FIG. 1 is a figure showing a display example of an image in a general image processing apparatus.

As shown in FIG. 1, an editing work region 21, where a key or the like for image editing is displayed, and a preview region 22, where an image to be edited is preview-displayed, are provided on an editing screen displayed in a display section 11 of a general image processing apparatus 1. A reduced image of the original image to be edited is preview-displayed in the preview region 22 so as to improve visibility.

JP 11-306374A and JP 2001-142602A describe technology in which a specific region to be edited is searched for by a user, from within such a reduced image that is preview-displayed. In the case where such a specific region is small, a range assumed to include the specific region is designated by an operation of the user and specified by a position of a mouse cursor, and the specified range is displayed in an enlarged manner.

SUMMARY

However, in the technology of JP 11-306374A and JP 2001-142602A, there are cases where the visibility of the specific region included within the enlarged range may decrease, a search omission of the specific region may occur, and an extended amount of time to search for the specific region may be necessary.

For example, it can be assumed that a complex object OB1 or a non-complex object OB2 is included within the enlarged range. In the case where a range including either the complex object OB1 or the non-complex object OB2 is displayed in an enlarged manner, since each of them are one part of a single image, both of them are displayed in an enlarged manner by a similar enlargement ratio set beforehand.

Therefore, in the case where the enlargement ratio is set to be small according to the non-complex object OB2, visibility decreases without the complex object OB1 being sufficiently displayed in an enlarged manner. As a result, there are cases where a search omission may occur in the case where the user searches for the specific region from the complex object OB1 within the enlarged range.

On the other hand, in the case where the enlargement ratio is set to be large according to the complex object OB1, the non-complex object OB2 is displayed in an enlarged manner unnecessarily large. As a result, there are cases where an extended amount of time to search for the specific region may be necessary, since a rough search may not be performed in the case where the user searches for the specific region from the non-complex object OB2 within the enlarged range.

Therefore, the user may have to perform an update operation for each enlargement ratio, according to the size and complexity of the object included in the specific region, and the operation may become complicated.

The present disclosure has been made in view of such situations, and a region of an image can be displayed in an enlarged manner, with an appropriate magnification according to the complexity of the image.

According to an embodiment of the present disclosure, there is provided an image processing apparatus, including an enlargement ratio setting section which sets a region of data in an original image, including a designated position designated as an object to be enlarged within the original image, as a region to be enlarged, and sets an enlargement ratio to the region to be enlarged, based on an image feature amount showing complexity of an image of the region to be enlarged, and an enlarged image generation section which generates enlarged image data for the data of the original image, by applying an enlargement process by the enlargement ratio set by the enlargement ratio setting section.

The enlargement ratio setting section may set the enlargement ratio so that the more a value of the image feature amount increases, the more the enlargement ratio increases.

The enlargement ratio setting section may obtain, as the image feature amount, a total sum of absolute values of differences between each pixel value of a smoothed image and the original image within the region to be enlarged.

The enlargement ratio setting section may calculate absolute values of differences between adjacent pixels for all pixels as the data of the original image to be processed, and may obtain, as the image feature amount, a total sum of absolute values of the differences between the adjacent pixels belonging to the region to be enlarged.

The image processing apparatus may further include a display control section which performs a control to display a reduced image of the original image, based on the data of the original image. The enlargement ratio setting section may set the enlargement ratio based on the reduced image. The display control section may further perform a control to superimpose the enlarged image on the designated position in the reduced image, based on the data of the enlarged image generated by the enlarged image generation section.

The image processing apparatus may further include a cursor speed setting section which sets a moving speed of a mouse cursor, based on the enlargement ratio set by the enlargement ratio setting section.

The cursor speed setting section may set the moving speed of the mouse cursor so that the more the enlargement ratio increases, the more the moving speed of the mouse cursor decreases.

An image processing method and program according to the embodiment of the present disclosure are the method and program corresponding to the image processing apparatus according to the embodiment of the present disclosure.

According to the embodiments of the present disclosure, there is provided an image processing apparatus, method and program, in which a region of data in an original image, including a designated position designated as an object to be enlarged within the original image, is set as a region to be enlarged, an enlargement ratio is set to the region to be enlarged, based on an image feature amount showing the complexity of the image in the region to be enlarged, and data of the enlarged image is generated for the data of the original image, by applying an enlargement process by the set enlargement ratio.

According to the present disclosure as stated above, a region of an image can be displayed in an enlarged manner, with an appropriate magnification depending on the complexity of the image.

BRIEF DESCRIPTION OF THE DRAWINGS

FIG. 6 is a figure showing an expansion ratio Sp obtained by the image feature amount and an expansion ratio offset So;

FIG. 7 is a figure showing a relation between an enlargement ratio and a moving speed of a mouse cursor;

FIG. 14 is a block diagram showing a configuration example of hardware of an image processing apparatus applicable to the present disclosure.

DETAILED DESCRIPTION OF THE EMBODIMENT(S)

Figure 1:
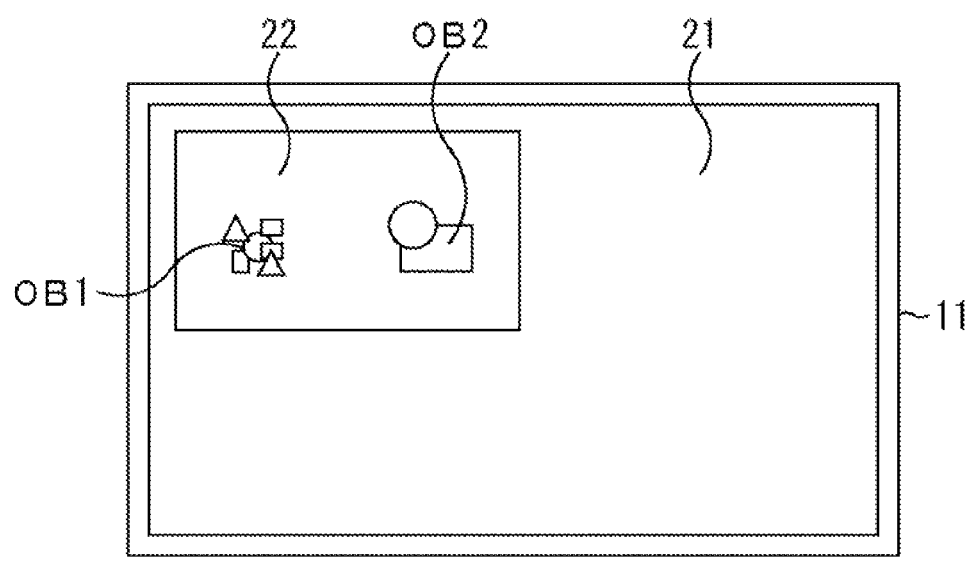
FIG. 1 is a figure showing a display example of an image in a general image processing apparatus.

Hereinafter, preferred embodiments of the present technology will be described in detail with reference to the appended drawings. Note that, in this specification and the appended drawings, structural elements that have substantially the same function and structure are denoted with the same reference numerals, and repeated explanation of these structural elements is omitted.

Firstly, in order to easily understand the present disclosure, an outline of the present disclosure will be described.

Figure 2:
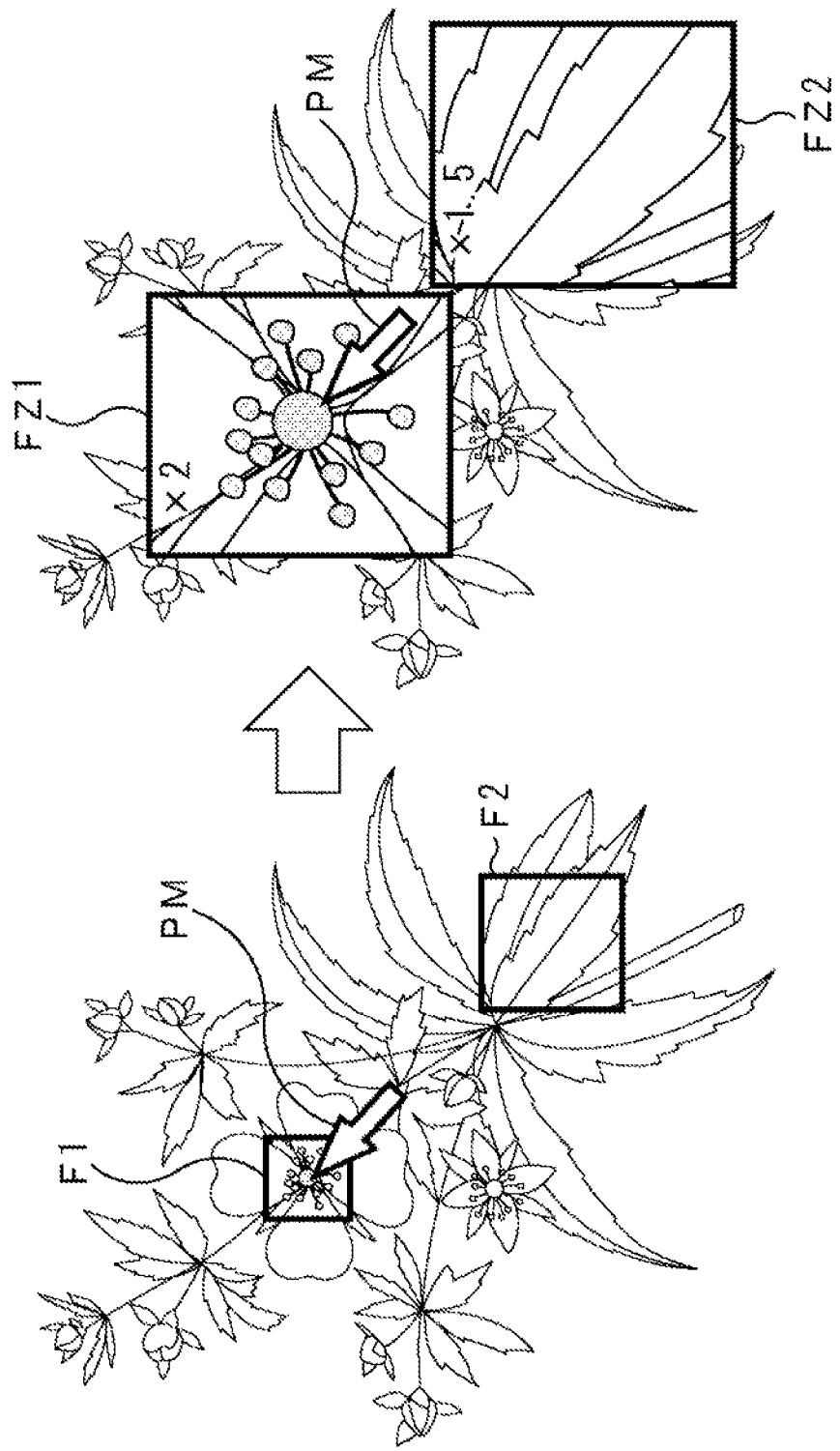
FIG. 2 is a figure describing the outline of the present disclosure.

FIG. 2 is a figure describing the outline of the present disclosure. FIG. 2 shows a reduced image of an original image to be image processed in an image processing apparatus applicable to the present disclosure. An outline of a series of processes, from such a reduced image, to searching for a specific region, and up until displaying the specific region in an enlarged manner, will be described. Note that the specific region is a region to be displayed in such an enlarged manner. Accordingly, hereinafter the specific region will be appropriately called the region to be enlarged.

In the example of FIG. 2, a region F1 within a prescribed range set beforehand, from within the reduced image shown in the left hand side figure of FIG. 2 and centered on a position indicated by a mouse cursor PM, is set to a region to be enlarged. Then, as shown in the right hand side figure of FIG. 2, an enlarged region FZ1, in which the region F1 is enlarged by an enlargement ratio of 2 times and centered on the position indicated by the mouse cursor PM, is superimposed on the reduced image. Note that the reduced image of this example is assumed to be an image of a plant.

Further, while not shown, when the mouse cursor PM moves so as to indicate the center of a region F2, this region F2 is set to a region to be enlarged. Then, as shown in the right hand side figure of FIG. 2, an enlarged region FZ2, in which the region F2 is enlarged by an enlargement ratio of 1.5 times, is superimposed on the reduced image.

Here, the enlargement ratio in the enlarged region FZ2 is 1.5 times, which is smaller than the enlargement ratio in the enlarged region FZ1 of 2 times. The reason is that the degree of complexity of the image in the region F1 is greater than the degree of complexity of the image in the region F2. That is, while the details will be described later, an image feature amount showing the degree of complexity of such an image is calculated for each region to be enlarged. Then, it is set so that the more the image feature amount increases in the region to be enlarged, that is, the more the degree of complexity of the image increases in the region to be enlarged, the more the enlargement ratio increases. In a word, in the example of FIG. 2, the region F1 to be enlarged, when compared to the region F2 to be enlarged separately, is set with a greater enlargement ratio, since the image feature amount is greater, that is, the degree of complexity of the image is greater.

In the present disclosure, such enlargement ratios in the enlarged regions are dynamically set depending on the image feature amount showing the degree of complexity of the regions to be enlarged.

In addition, in the example of FIG. 2, a technique which displays all the enlarged regions at a similar size (that is, a similar area) may be adopted as a display technique of an enlarged region. Therefore, the enlarged regions FZ1 and FZ2 may be displayed at a similar size.

[Configuration Example of an Image Processing Apparatus]

Figure 3:
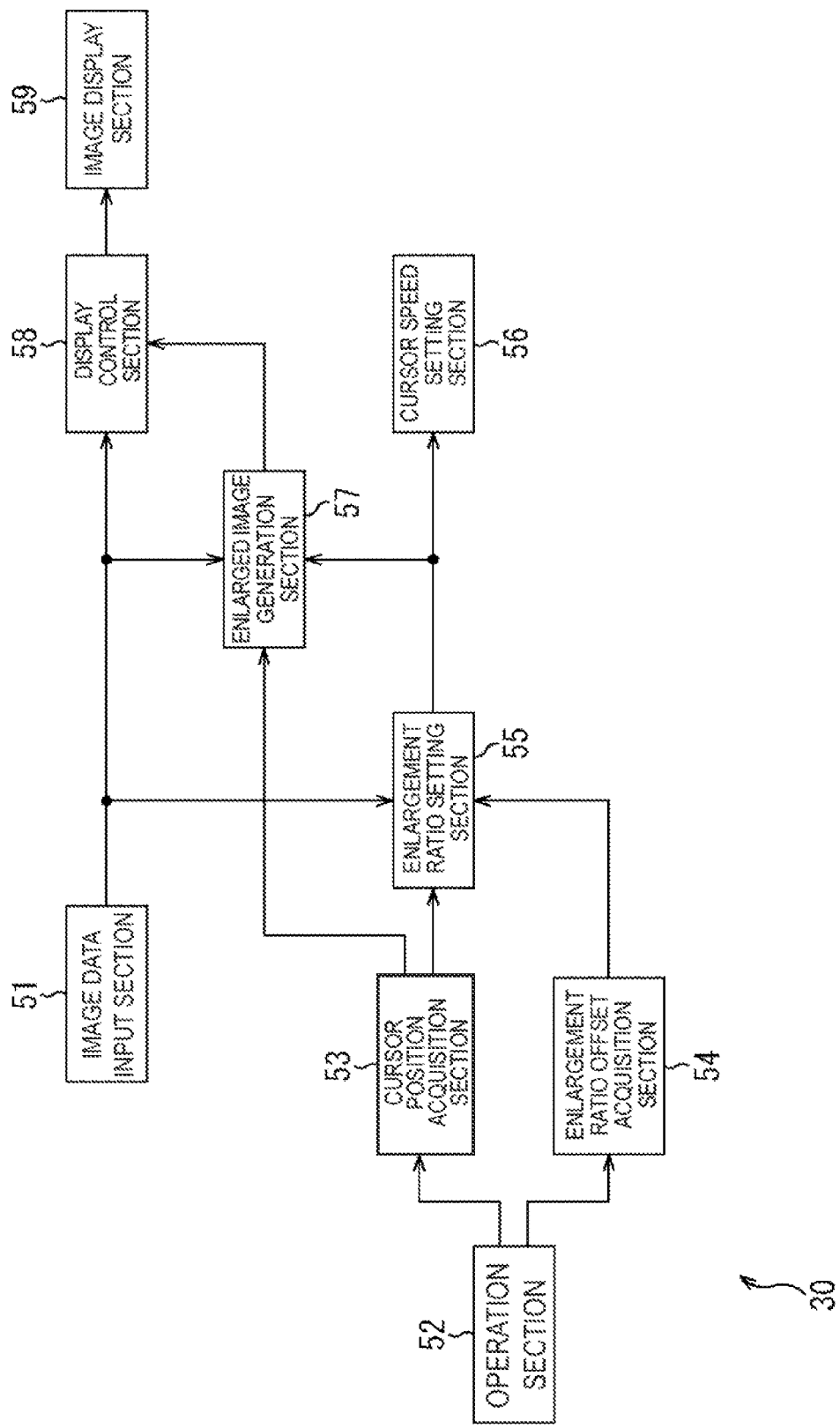
FIG. 3 is a block diagram showing a configuration example of an image processing apparatus applicable to the present disclosure.

FIG. 3 is a block diagram showing a configuration example of an image processing apparatus applicable to the present disclosure.

As shown in FIG. 3, an image processing apparatus 30 has an image data input section 51, an operation section 52, a cursor position acquisition section 53, an enlargement ratio offset acquisition section 54, an enlargement ratio setting section 55, a cursor speed setting section 56, an enlarged image generation section 57, a display control section 58, and an image display section 59.

The image data input section 51 inputs image data of an original image to be edited from another image processing apparatus or a storage section, not shown, and supplies the acquired image data of the original image to the enlargement ratio setting section 55, the enlarged image generation section 57, and the display control section 58.

The operation section 52 receives a mouse operation by a user, and supplies an operation signal according to this mouse operation to the cursor position acquisition section 53 and the enlargement ratio offset acquisition section 54.

The cursor position acquisition section 53 acquires coordinates (Xp, Yp) of a position Pp of the mouse cursor displayed in the image display section 59 of the image processing apparatus 30, based on the operation signal supplied from the operation section 52. Here, to make comparison to related art easy for the present embodiment, an editing screen similar to that of FIG. 1, that is, an editing screen including an editing work region and a preview region, is displayed in the image display section 59. Then, the coordinates (Xp, Yp) of the position Pp of the mouse cursor acquired by the cursor position acquisition section 53 are specified by a coordinate system of the preview region.

Here, it is assumed that a horizontal by vertical size of the image display section 59 is Wa×Ha, and a horizontal by vertical size of the preview region is Wp×Hp. Note that the aspect ratios Wa>Wp and Ha>Hp are assumed to be the same. In this case, the size of a reduced image displayed in the preview region becomes 1/N times the size of the image display section 59 (N=Wa/Wp). The cursor position acquisition section 53 converts the coordinates (Xp, Yp) of the position Pp of the mouse cursor in the preview region into coordinates (Xa, Ya) of a position Pa in the coordinate system of the entire image in the image display section 59. The cursor position acquisition section 53 retains the coordinates (Xa, Ya) of the position Pa, after the coordinate conversion, as a mouse cursor position.

The enlargement ratio offset acquisition section 54 acquires an enlargement ratio offset So, based on the operation signal supplied from the operation section 52. In the case where an enlargement ratio S is set by the enlargement ratio setting section 55, described later, the enlargement ratio offset So is an offset value added by an operation of the user to the enlargement ratio Sp, described later. That is, an adjustment of the enlargement ratio Sp is possible by the addition of a variable enlargement ratio offset So. Note that the technique of acquiring the enlargement ratio offset So is not particularly limited, and, for example, the enlargement ratio offset So may be acquired according to a rotation direction and a rotation amount by the user rotating the wheel button of the mouse.

In the case where the minimum and maximum values of the enlargement ratio Sp, obtained by the image ratio amount set by the enlargement ratio setting section 55, described later, are assumed to be Spmin and Spmax, respectively, the possible range of the enlargement ratio offset can be represented by [−(Spmax−Spmin)≤So≤(Spmax−Spmin)]. Note that an additional relation between the enlargement ratio Sp and the enlargement ratio offset So will be describe later by referring to FIG. 6.

The enlargement ratio offset acquisition section 54 supplies the acquired enlargement ratio offset So to the enlargement ratio setting section 55.

The enlargement ratio setting section 55 sets an enlargement ratio S of the region to be enlarged. The enlargement ratio setting section 55 firstly calculates the enlargement ratio Sp of the region to be enlarged, based on the image feature amount showing the complexity of the image in the region to be enlarged. Note that in order to clearly distinguish such an enlargement ratio Sp calculated based on the image feature amount from that of the enlargement ratio S finally output from the enlargement ratio setting section 55, it will be called an enlargement ratio Sp obtained by the image feature amount.

Note that the image feature amount showing the complexity of the image in the region to be enlarged is not particularly limited, and may be a feature amount which can show the complexity of the image. Then, the enlargement ratio setting section 55 sets a value, in which the enlargement ratio Sp obtained by the image feature amount and the enlargement ratio offset So supplied from the enlargement ratio offset acquisition section 54 are added, as the enlargement ratio S of the region to be enlarged.

In the present embodiment, the total sum of the absolute values of the differences between a smoothed image and an original image, within a constant range (that is, a region to be enlarged) from the mouse cursor position Pa, is used as the image feature amount showing the complexity of the image in the region to be enlarged. A detailed configuration of the enlargement ratio setting section 55 which determines the enlargement ratio S, based on such an image feature amount, will be described by referring to FIG. 4.

[Configuration Example of the Enlargement Ratio Setting Section]

Figure 4:
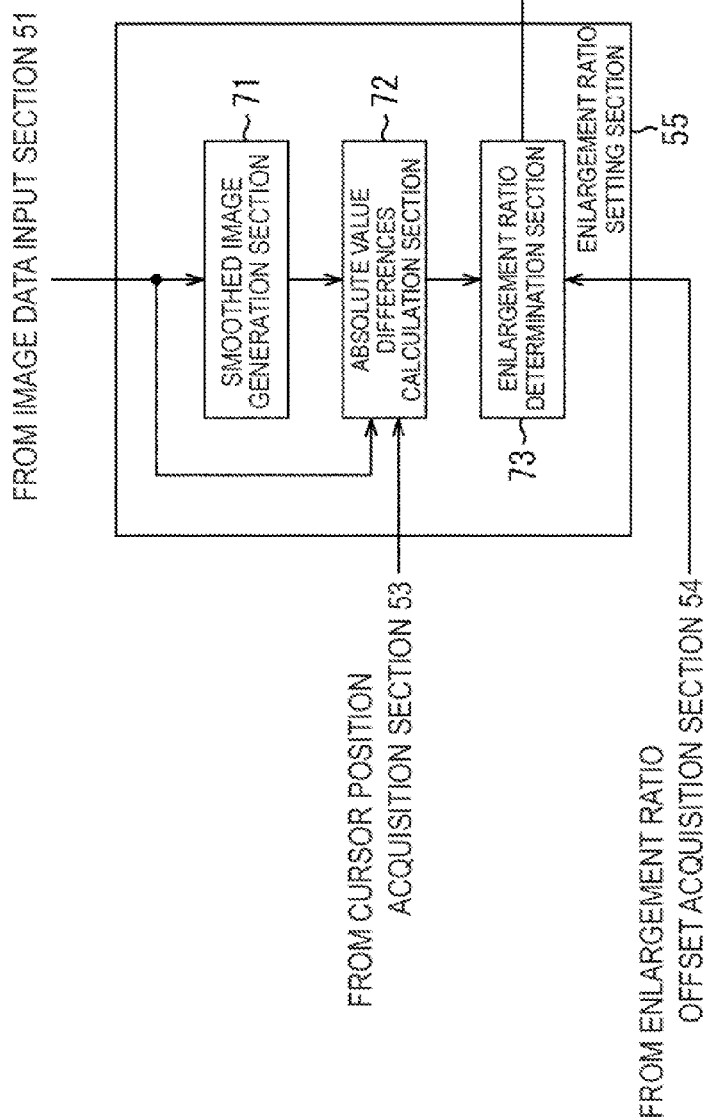
FIG. 4 is a block diagram showing a configuration example of an enlargement ratio setting section.

FIG. 4 is a block diagram showing a configuration example of the enlargement ratio setting section 55.

As shown in FIG. 4, the enlargement ratio setting section 55 has a smoothed image generation section 71, an absolute value differences calculation section 72, and an enlargement ratio determination section 73.

The smoothed image generation section 71 generates data of a smoothed image from the image data of the original image input to the image data input section 51. Note that the generation technique of the data of the smoothed image is not particularly limited. For example, a technique may be adopted which generates the data of the smoothed image, by successively setting each pixel configuring the original image as a pixel targeted to be processed (hereinafter, called a target pixel), calculating a mean value of each pixel value, such as a block including the target pixel and the surrounding pixels, setting the mean value as a new pixel value of the target pixel, and repeating these processes. Or, a technique may be adopted which generates the data of the smoothed image, by applying a low pass filter including arbitrary coefficients to the data of the original image.

Note that the smoothed image generation section 71, for example, may generate the data of the smoothed image when an enlarged display function is activated, or when an enlarged display function is activated and an image displayed in the preview region is updated.

The absolute value differences calculation section 72 assumes that a constant range centered on the mouse cursor position Pa supplied by the cursor position acquisition section 53 is a range to be enlarged, and calculates a total sum σ1 of the absolute values of the differences between each pixel value of the smoothed image and the original image within the range to be enlarged. Then, the absolute value differences calculation section 72 supplies the total sum σ1 of the calculated absolute values of the differences to the enlargement ratio determination section 73 as the image feature amount showing the complexity of the image in the region to be enlarged.

The enlargement ratio determination section 73 calculates the enlargement ratio Sp obtained by the image feature amount for this region to be enlarged, based on the image feature amount showing the complexity of the image in the region to be enlarged, that is, based on the total sum σ1 of the absolute values of the differences of the region to be enlarged, supplied from the absolute value differences calculation section 72. For example, the enlargement ratio Sp obtained by the image feature amount is calculated by using the following Equation (1).

$$Sp = \sigma 1 \times A0 + A1 \ (A0 \text{ is a constant}, A1 = 1.0) \tag{1}$$

Figure 5:
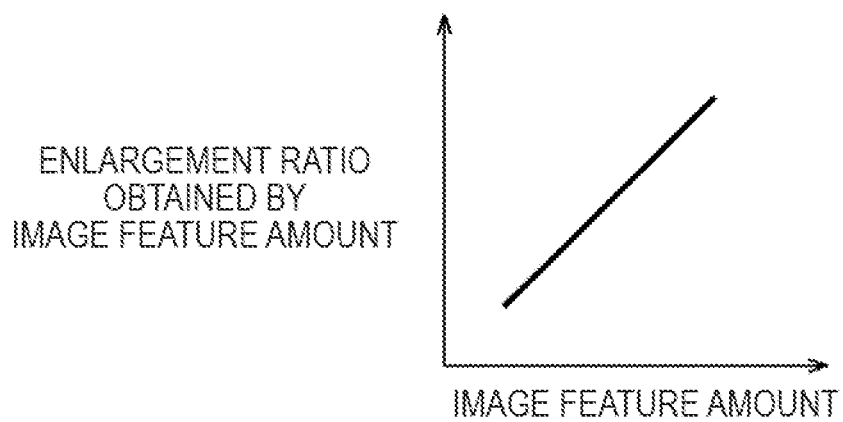
FIG. 5 is a figure showing a relation between an image feature amount and an enlargement ratio Sp obtained by the image feature amount.

The enlargement ratio determination section 73 calculates the enlargement ratio Sp, as shown in FIG. 5.

[Relation Between the Image Feature Amount and the Enlargement Ratio]

FIG. 5 is a figure showing the relation between the image feature amount and the enlargement ratio Sp obtained by the image feature amount. The vertical axis of FIG. 5 shows the enlargement ratio Sp obtained by the image feature amount and the horizontal axis shows the image feature amount showing the complexity of the image.

As shown in FIG. 5, the more the value of the image feature amount showing the complexity of the image in the region to be enlarged increases, that is, the more the total sum σ1 of the absolute values of the differences from the region to be enlarged increases, the more the enlargement ratio Sp obtained by the image feature amount increases. That is, the more complex the image, the more the enlargement ratio Sp obtained by the image feature amount increases.

In addition, the enlargement ratio determination section 73 adds the enlargement ratio offset So supplied from the enlargement ratio offset acquisition section 54 to the enlargement ratio Sp obtained by the image feature amount, and determines the enlargement ratio S of the output for the region to be processed. Here, the enlargement ratio Sp obtained by the image feature amount and the enlargement ratio offset So will be described by referring to FIG. 6.

[Enlargement Ratio Sp Obtained by the Image Feature Amount and the Enlargement Ratio Offset So]

FIG. 6 is a figure showing the expansion ratio Sp obtained by the image feature amount and the expansion ratio offset So. FIG. 6A shows the enlargement ratio Sp obtained by the image feature amount, and FIG. 6B shows the enlargement ratio offset So.

As shown in FIG. 6A, for example, it is assumed that the possible range of the enlargement ratio Sp obtained by the image feature amount set by the enlargement ratio setting section 55 has a minimum value Spmin=1.0 and a maximum value Spmax=5.0. In this case, the possible range of the enlargement ratio offset So becomes $[-(5.0-1.0) \leq So \leq (5.0-1.0)]$, as described above. That is, as shown in FIG. 6B, the possible range of the enlargement ratio offset So becomes −4.0 to 4.0.

For example, the enlargement ratio Sp obtained by the image feature amount by the enlargement ratio determination section 73 is 3.0, and in the case where the enlargement ratio offset So supplied from the enlargement ratio offset setting section 54 is 1.0, both are added and the enlargement ratio S is determined to be 4.0.

The enlargement ratio determination section 73 supplies the determined enlargement ratio S to the cursor speed setting section 56 and the enlarged image generation section 57.

The cursor speed setting section 56 sets the moving speed of the mouse cursor, based on the enlargement ratio S supplied from the enlargement ratio setting section 55. Specifically, as shown in FIG. 7, the cursor speed setting section 56 sets the moving speed of the mouse cursor so that the more the enlargement ratio S of the region to be processed increases, the more the moving speed of the mouse cursor decreases.

FIG. 7 is a figure showing the relation between the enlargement ratio S and the moving speed of the mouse cursor. The vertical axis of FIG. 7 shows the moving speed of the mouse cursor, and the horizontal axis shows the enlargement ratio S.

In the case where the relation of FIG. 7A is adopted, the moving speed of the mouse cursor linearly decreases in proportion to an increase of the enlargement ratio S. On the other hand, in the case where the relation of FIG. 7B is adopted, the more the enlargement ratio S increases, the more the moving speed of the mouse cursor decreases curvilinearly. Note that the relations of FIGS. 7A and 7B merely illustrate examples and a relation where the more the enlargement ratio S increases, the more the moving speed of the mouse cursor decreases, may also suffice. Further, in the case where both of these relations are adopted, the user can switch to either one in accordance with their preference.

Returning to FIG. 3, the enlarged image generation section 57 generates data of an enlarged image by enlarging, with the enlargement ratio S supplied from the enlargement ratio setting section 55, data of an image within a constant range centered on the mouse cursor position Pa supplied from the cursor position acquisition section 53, and from within the image data of the original image input to the image data input section 51.

As shown above, the preview region is a size 1/N times that of the screen of the image display section 59. That is, a reduced image 1/N times that of the original image is displayed in the preview region, based on the original image in the case where the original image is displayed on the entire screen of the image display section 59. Here, in the case where the enlargement ratio is S=1.0, the enlarged image generation section 57 assumes, from the reduced image of the original image displayed in the preview region, that the data of the enlarged image is as it is without enlarging the image within the constant range centered on the mouse cursor position Pa. In other words, the enlarged image generation section 57 generates the data of the enlarged image by setting the data of the image within the constant region in the original image to 1/N times. In the case of the enlargement ratio S, the enlarged image generation section 57 generates the data of the enlarged image by setting the data of the image within the constant region in the original image to S/N times. In this way, the enlargement ratio S is set based on a reduced image of the original image. Note that in the case where the enlargement ratio S>N, that is, in the case where the enlargement ratio may have to be enlarged more than that of the original image, the enlarged image generation section 57 generates data of the enlarged image by enlarging the data of the original image by an arbitrary technique.

The enlarged image generation section 57 supplies the generated enlarged image to the display control section 58.

The display control section 58 assumes that the data of the reduced image reduced 1/N times that of the data of the original image supplied from the image data input section 51 is data to be displayed, and displays this reduced image in the preview region of the image display section 59. In addition, the display control section 58 assumes that the data of the enlarged image supplied from the enlarged image generation section 57 is data to be displayed, and superimposes this enlarged image on the reduced image centered on the position Pp of the mouse cursor in the preview region of the image display section 59. The display of the enlarged image will be described by referring to FIG. 8.

[Display of the Enlarged Image]

Figure 8:
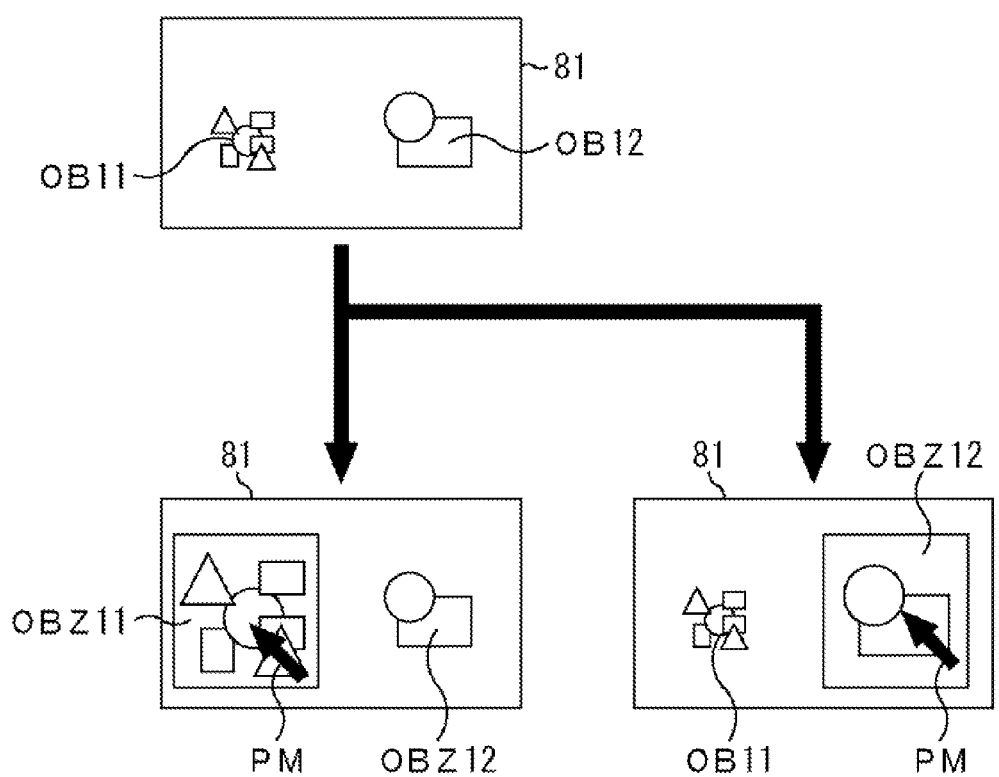
FIG. 8 is a figure showing a display in a preview region.

FIG. 8 is a figure showing the display in the preview region.

The figure at the top of FIG. 8 shows the preview region 81 of the image display section 59. A reduced image, 1/N times that of the original image, is displayed in the preview region 81. In the example of FIG. 8, a complex shaped object OB11 and a non-complex (that is, simple) shaped object OB12 are included in the reduced image.

When the mouse cursor PM is positioned on the complex shaped object OB11, as shown in the bottom left hand side figure of FIG. 8, an enlarged image OBZ11, in which the region to be enlarged including the object OB11 is enlarged by the prescribed enlargement ratio S, is superimposed on the object OB11 centered on the position of the mouse cursor PM.

On the other hand, if the mouse cursor PM is positioned on the non-complex shaped object OB12, as shown in the bottom right hand side figure of FIG. 8, an enlarged image OBZ12, in which the region to be enlarged including the object OB12 is enlarged by the prescribed enlargement ratio S, is superimposed on the object OB12 centered on the position of the mouse cursor PM.

Note that the positions where the enlarged regions OBZ 11 and OBZ 12 are displayed are not limited to the position PM of the mouse cursor, and may be regions other than the preview region 81, for example.

Next, the process in which the image processing apparatus 30 displays the enlarged image (hereinafter, called an enlarged image display process) will be described by referring to FIG. 9.

[Enlarged Image Display Process]

Figure 9:
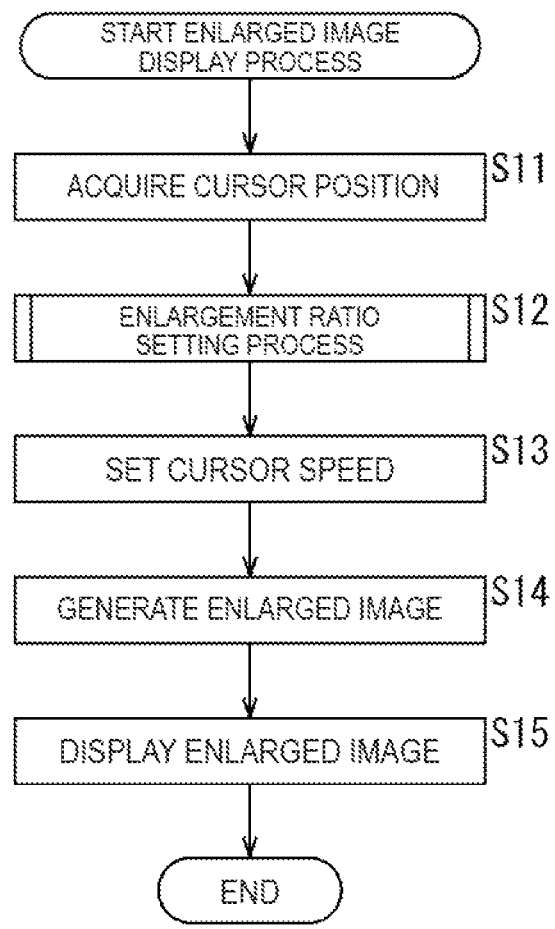
FIG. 9 is a flow chart describing the flow of an enlarged image display process.

FIG. 9 is a flow chart describing the flow of the enlarged image display process.

In step S11, the cursor position acquisition section 53 acquires the position of the mouse cursor. That is, the cursor position acquisition section 53 acquires the position Pa of the mouse cursor displayed on the image display section 59 of the image processing apparatus 30, based on the operation signal supplied from the operation section 52.

In step S12, the enlargement ratio setting section 55 performs an enlargement ratio setting process. Note that details of the enlargement ratio setting process will be described later by referring to FIG. 10.

In step S13, the cursor speed setting section 56 sets the cursor speed. That is, the cursor speed setting section 56 sets the moving speed of the mouse cursor, as shown in FIG. 7, based on the enlargement ratio S set by the enlargement ratio setting section 55 in step S12.

In step S14, the enlarged image generation section 57 generates an enlarged image. That is, the enlarged image generation section 57 generates data of an enlarged image by enlarging, with the enlargement ratio S set by the enlargement ratio setting section 55 in step S12, the data of the image within a constant range centered on the position Pa of the mouse cursor obtained by the cursor position acquisition section 53 in step S11, and from within the image data of the original image.

In step S15, the display control section 58 displays the enlarged image on the image display section 59.

In this way, the enlarged image display process ends.

Next, details of the enlargement ratio setting process of step S12 will be described by referring to FIG. 10.

[Enlargement Ratio Setting Process]

Figure 10:
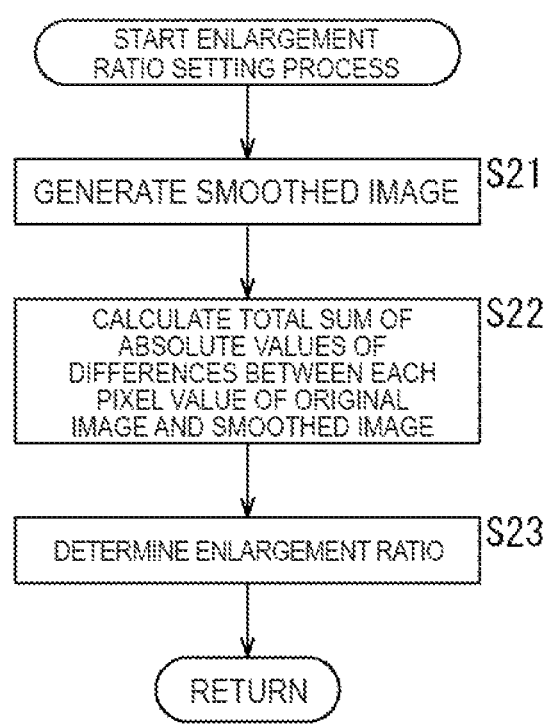
FIG. 10 is a figure describing an enlargement ratio setting process.

FIG. 10 is a figure describing the enlargement ratio setting process.

In step S21, the smoothed image generation section generates a smoothed image. That is, the smoothed image generation section 71 generates data of a smoothed image by setting each pixel configuring the original image as a target pixel, calculating a mean value of each pixel value, such as a block including the target pixel and the surrounding pixels, setting the mean value as a new pixel value of the target pixel, and repeating these processes by successively updating the target pixel.

In step S22, the absolute value differences calculation section 72 calculates the total sum σ1 of the absolute values of the differences between each pixel value of the original image and the smoothed image. That is, the absolute value differences calculation section 72 sets a constant range centered on the mouse cursor position Pa acquired by the cursor position acquisition section 53 in step S11 as the range to be enlarged, and calculates the total sum of the absolute values of the differences between each pixel value of the original image and the smoothed image within the range to be enlarged.

In step S23, the enlargement ratio determination section 73 sets the enlargement ratio S. That is, the enlargement ratio determination section 73 calculates the enlargement ratio Sp obtained by the image feature amount, based on the calculated total sum σ1 of the absolute values of the differences between the original image and the smoothed image in step S22. Then, the enlargement ratio determination section 73 adds the enlargement ratio offset So supplied from the enlargement ratio offset acquisition section 54 to the enlargement ratio Sp obtained by the image feature amount, and determines the enlargement ratio S.

In this way, the enlargement ratio setting process ends, and the process returns to step S13 of FIG. 9.

[Another Configuration Example of the Enlargement Ratio Setting Section]

In the above example, the total sum of the absolute values of the differences between the smoothed image and the original image, obtained from within a constant region centered on the mouse position Pa, was adopted as the image feature amount showing the complexity of an image in the region to be enlarged. However, the image feature amount showing the complexity of an image in the region to be enlarged is not limited to the above example. For example, the total sum of the absolute values of the differences between adjacent pixels within a constant region centered on the mouse position Pa may be adopted as the image feature amount showing the complexity of an image in the region to be enlarged.

A configuration example of an image processing apparatus in which the enlargement ratio is set based on such an image feature amount has functions and a configuration basically the same as the image processing apparatus 30 of FIG. 3. Therefore, hereinafter the description of points identical to those of the image processing apparatus 30 of FIG. 3 will be omitted, and the differences, that is, the enlargement ratio setting section 91 with a configuration different from that of the enlargement ratio setting section 55 of FIG. 3, will be described.

Figure 11:
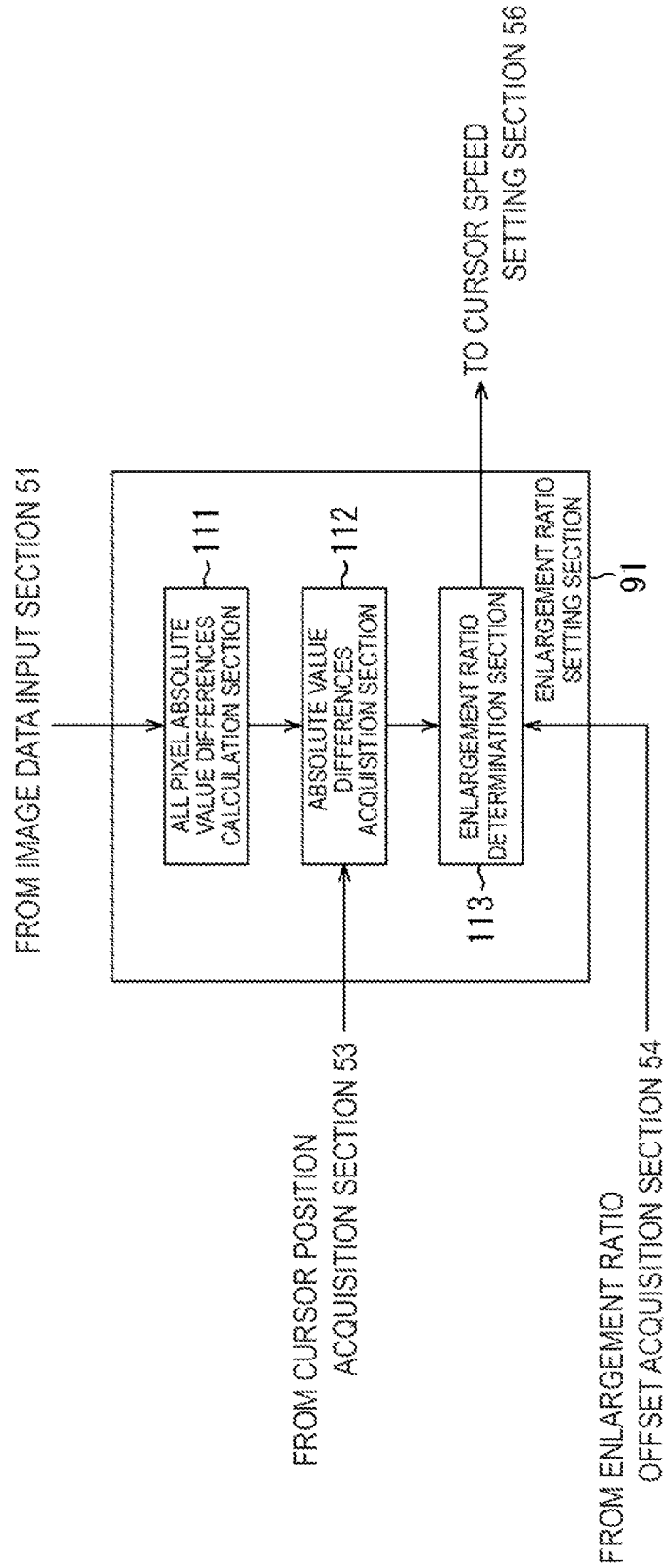
FIG. 11 is a block diagram showing a configuration example of another enlargement ratio setting section.

FIG. 11 is a block diagram showing a configuration example of the enlargement ratio setting section 91.

As shown in FIG. 11, the enlargement ratio setting section 91 has an all pixel absolute value differences calculation section 111, an absolute value differences acquisition section 112, and an enlargement ratio determination section 113.

The all pixel absolute value differences calculation section 111 assumes that the image data of the original image input to the image data input section 51 is to be enlarged, and calculates the absolute values of the differences between adjacent pixels for all the pixels. For example, the total sum of the absolute values of the differences between each pixel value may be adopted for pixels targeted to be processed (hereinafter, called target pixels), for example, as absolute values of the differences between adjacent pixels, absolute values of the differences between each pixel value of pixels directly to the right, or pixels directly below the target pixel. Then, the all pixel absolute value differences calculation section 111 supplies the absolute values of the differences between adjacent pixels for all the pixels to the absolute value differences acquisition section 112.

Note that the all pixel absolute value differences calculation section 111 calculates the absolute values of the differences between adjacent pixels for all the pixels, for example, when an enlarged image function is activated, or when an enlarged display function is activated and an image displayed in the preview region is updated.

The absolute value differences acquisition section 112 assumes that a constant range centered on the mouse cursor position Pa supplied by the cursor position acquisition section 53 is the region to be enlarged, and acquires a total sum σ2 of the absolute values of the differences between adjacent pixels belonging to the range of the region to be enlarged, from among the absolute values of the differences between adjacent pixels for all the pixels supplied from the all pixel absolute value differences calculation section 111. The absolute value differences acquisition section 112 supplies the acquired total sum σ2 of the absolute values of the differences between adjacent pixels to the enlargement ratio determination section 113 as the image feature amount showing the complexity of the image in the region to be enlarged.

The enlargement ratio determination section 113 calculates the enlargement ratio Sp obtained by the image feature amount, based on the image feature amount showing the complexity of the image in the region to be processed, that is, the total sum σ2 of the absolute values of the differences between adjacent pixels of the image within a constant range centered on the mouse cursor position Pa, supplied from the absolute value differences acquisition section 112. For example, the enlargement ratio Sp may be calculated by using the following Equation (2).

$$Sp = \sigma 2 \times B0 + B1 \text{ (}B0 \text{ is a constant, } B1=1.0) \quad (2)$$

The enlargement ratio determination section 113, as shown in FIG. 5, calculates so that the more the value of the image feature amount showing the complexity of the image in the region to be processed increases, the more the enlargement ratio Sp obtained by the image feature amount increases.

In addition, the enlargement ratio determination section 113 adds the enlargement ratio offset So supplied from the enlargement ratio offset acquisition section 54 to the enlargement ratio Sp obtained by the image feature amount, and determines the enlargement ratio S to be output. The enlargement ratio determination section 113 supplies the determined enlargement ratio S to the cursor setting section 56 and the enlarged image generation section 57.

Next, the enlarged image display process of the image processing apparatus 30 having the enlargement ratio setting section 91 will be described. Note that the enlarged image display process of the image processing apparatus 30 having the enlargement ratio setting section 91 is basically the same as the enlarged image display process of FIG. 9. Therefore, hereinafter points identical to those of the enlarged image display process of FIG. 9 will be omitted, and the differences, that is, the enlargement ratio setting process of step S12 of FIG. 9, will be described.

[Enlargement Ratio Setting Process]

Figure 12:
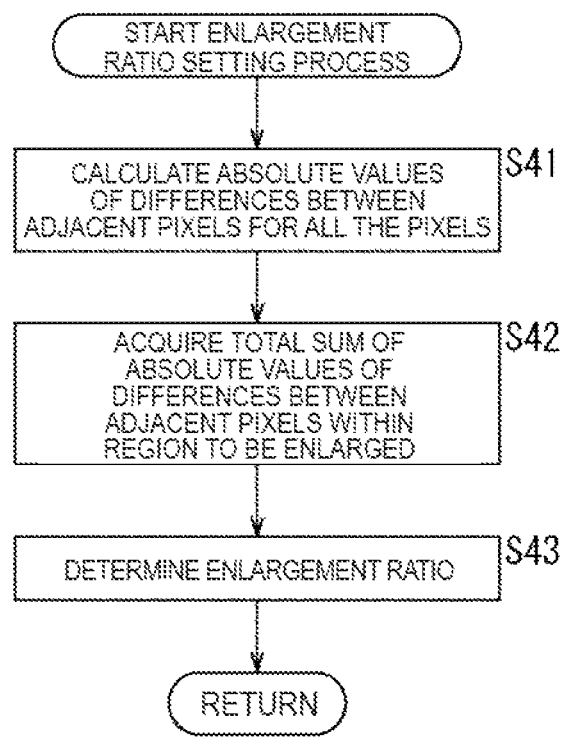
FIG. 12 is a figure describing an enlargement ratio setting process.

FIG. 12 is a figure describing the enlargement ratio setting process.

In step S41, the all pixel absolute value differences calculation section 111 calculates the absolute values of the differences between adjacent pixels for all the pixels.

In step S42, the absolute value differences acquisition section 112 acquires the total sum σ2 of the absolute values of the differences between adjacent pixels within the region to be enlarged. That is, the absolute value differences acquisition section 112 assumes that a constant range centered on the mouse cursor position Pa acquired by the cursor position acquisition section 53 in step S11 is a range to be enlarged, and acquires the total sum σ2 of the absolute values of the differences between adjacent pixels belonging to the range of the region to be enlarged, from among the absolute values of the differences between adjacent pixels for all the pixels calculated by the all pixel absolute value differences calculation section 111 in step S41.

In step S43, the enlargement ratio determination section 113 determines the enlargement ratio S. That is, the enlargement ratio determination section 113 calculates the enlargement ratio Sp obtained by the image feature amount, based on the total sum σ2 of the absolute values of the differences between adjacent pixels within the region to be processed acquired in step S42. Then, the enlargement ratio determination section 113 adds the enlargement ratio offset So supplied from the enlargement ratio offset acquisition section 54 to the enlargement ratio Sp obtained by the image feature amount, and determines the enlargement ratio S.

In this way, the enlargement ratio setting process ends, and the process returns to step S13 of FIG. 9.

In this way in the present embodiment, in the case where a specific region from a reduced image is displayed in an enlarged manner and searched for, a complex image, in which the visibility is lowered in order to be reduced, is displayed with a high magnification, and the speed of the mouse cursor is decreased in accordance with this. Therefore, in the case where a specific region from the reduced image is searched for, the occurrence of a search omission is reduced. On the other hand, the non-complex image, in which the visibility does not greatly change even if it is reduced, is displayed in an enlarged manner with a low magnification, and the speed of the mouse cursor is increased in accordance with this. Therefore, in the case where the specific region from the reduced image is selected, a shortening of the selection time can be achieved.

That is, in the present embodiment, since a region of an image can be displayed in an enlarged manner, with an appropriate magnification depending on the complexity of the image, the visibility of the enlarged image is improved, and a search omission of the specific region to be edited and the amount of time taken to search for the specific region can be reduced.

[Another Display Example of the Enlarged Region]

As shown above in the example of FIG. 2, a technique which displays all the enlarged regions at a similar size (that is, a similar area) may be adopted as a display technique of an enlarged region. Therefore, the enlarged regions FZ1 and FZ2 may be displayed at a similar size. As a result, the respective size of each region to be enlarged does not become the same, and the more the expansion ratio increases, the more the respective sizes decrease. Specifically, the region F1 to be enlarged becomes smaller than the region F2 to be enlarged. However, the display technique of an enlarged region is not limited to such an example as that of FIG. 2.

Figure 13:
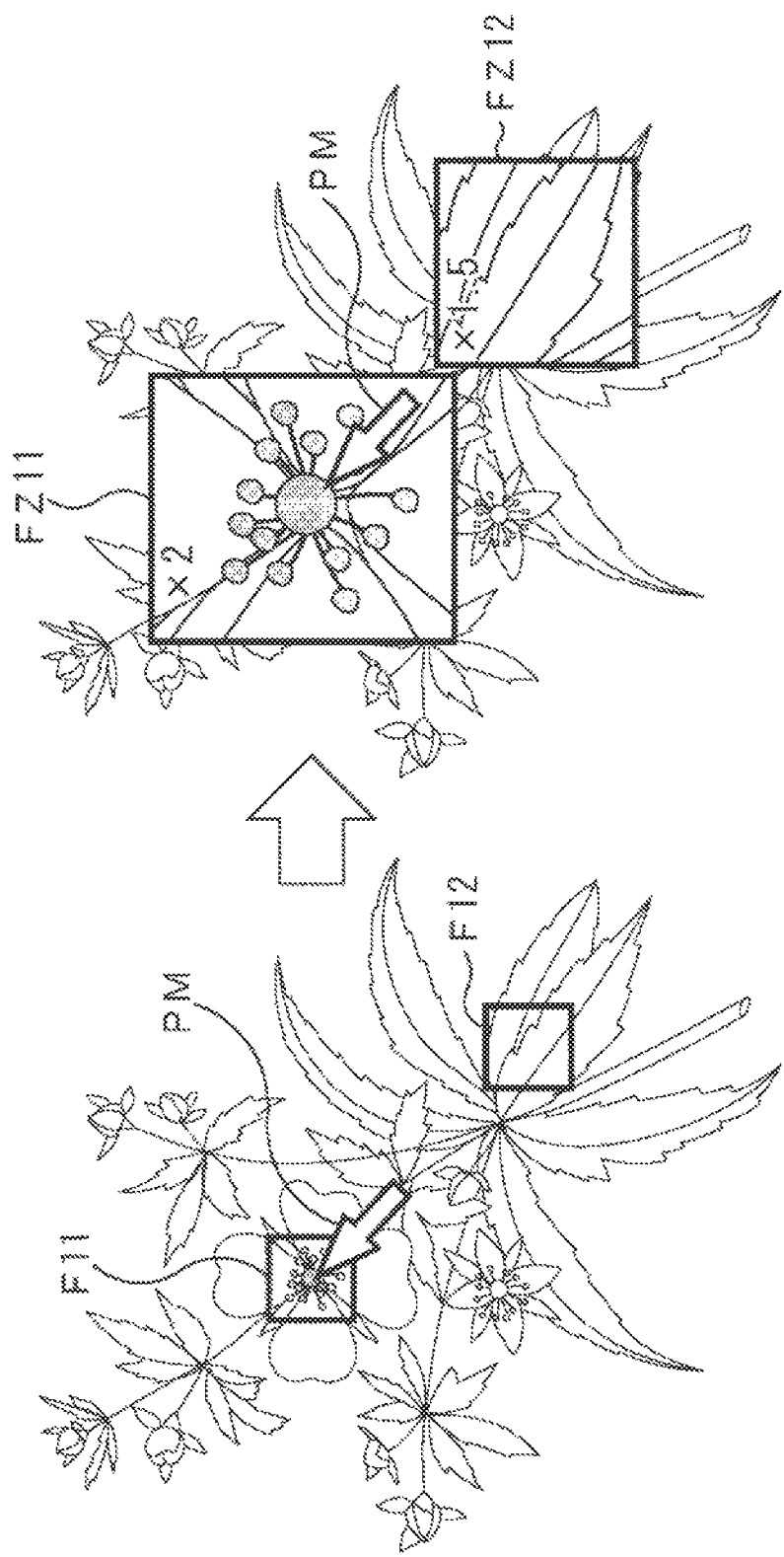
FIG. 13 is a figure showing another example of a display technique of an enlarged region.

FIG. 13 is a figure showing another example of the display technique of the enlarged region.

In the example of FIG. 13, a technique may be adopted which respectively displays, upon setting the size of each region to be enlarged to be the same, enlarged regions, in which each of the regions to be processed are each enlarged by an enlargement ratio, that is, enlarged regions in which the sizes (resolution) according to the enlargement ratio are different, as a display technique of a region to be enlarged.

Specifically, as shown in the left hand side figure of FIG. 13, the region F11 to be enlarged and the region F12 to be enlarged become the same size. As a result of the enlarged display by this condition, as shown in the right hand side figure of FIG. 13, the enlarged region FZ11, to which the region F11 to be enlarged is enlarged by 2 times, and the enlarged region FZ12, to which the region F12 to be enlarged is enlarged by 1.5 times, are respectively displayed. That is, the enlarged region FZ11 and the enlarged region FZ12 are respectively displayed, at a different size (resolution) according to the enlargement ratio, specifically, at a different size by a ratio the same as the enlargement ratio (2:1.5).

[Application of Present Technology to Program]

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

FIG. 14 is a block diagram showing an example configuration of the hardware of a computer that executes the series of processes described earlier according to a program.

In the computer, a central processing unit (CPU) 201, a read only memory (ROM) 202 and a random access memory (RAM) 203 are mutually connected by a bus 204.

An input/output interface 205 is also connected to the bus 204. An input unit 206, an output unit 207, a storage unit 208, a communication unit 209, and a drive 210 are connected to the input/output interface 205.

The input unit 206 is configured from a keyboard, a mouse, a microphone or the like. The output unit 207 configured from a display, a speaker or the like. The storage unit 208 is configured from a hard disk, a non-volatile memory or the like. The communication unit 209 is configured from a network interface or the like. The drive 210 drives a removable media 211 such as a magnetic disk, an optical disk, a magneto-optical disk, a semiconductor memory or the like.

In the computer configured as described above, the CPU 201 loads a program that is stored, for example, in the storage unit 208 onto the RAM 203 via the input/output interface 205 and the bus 204, and executes the program. Thus, the above-described series of processing is performed.

Programs to be executed by the computer (the CPU 201) are provided being recorded in the removable media 211 which is a packaged media or the like. Also, programs may be provided via a wired or wireless transmission medium, such as a local area network, the Internet or digital satellite broadcasting.

In the computer, by inserting the removable media 211 into the drive 210, the program can be installed in the storage unit 208 via the input/output interface 205. Further, the program can be received by the communication unit 209 via a wired or wireless transmission media and installed in the storage unit 208. Moreover, the program can be installed in advance in the ROM 202 or the storage unit 208.

It should be noted that the program executed by a computer may be a program that is processed in time series according to the sequence described in this specification or a program that is processed in parallel or at necessary timing such as upon calling.

The embodiment of the present technology is not limited to the above-described embodiment. It should be understood by those skilled in the art that various modifications, combinations, sub-combinations and alterations may occur depending on design requirements and other ratios insofar as they are within the scope of the appended claims or the equivalents thereof.

Additionally, the present technology may also be configured as below.

(1) An image processing apparatus, including:
an enlargement ratio setting section which sets a region of data in an original image, including a designated position designated as an object to be enlarged within the original image, as a region to be enlarged, and sets an enlargement ratio to the region to be enlarged, based on an image feature amount showing complexity of an image of the region to be enlarged; and
an enlarged image generation section which generates enlarged image data for the data of the original image, by applying an enlargement process by the enlargement ratio set by the enlargement ratio setting section.

(2) The image processing apparatus according to (1),
wherein the enlargement ratio setting section sets the enlargement ratio so that the more a value of the image feature amount increases, the more the enlargement ratio increases.

(3) The image processing apparatus according to (1) or (2),
wherein the enlargement ratio setting section obtains, as the image feature amount, a total sum of absolute values of differences between each pixel value of a smoothed image and the original image within the region to be enlarged.

(4) The image processing apparatus according to any of (1) to (3),
wherein the enlargement ratio setting section calculates absolute values of differences between adjacent pixels for all pixels as the data of the original image to be processed, and obtains, as the image feature amount, a total sum of absolute values of the differences between the adjacent pixels belonging to the region to be enlarged.

(5) The image processing apparatus according to any of (1) to (4), further including:
a display control section which performs a control to display a reduced image of the original image, based on the data of the original image;
wherein the enlargement ratio setting section sets the enlargement ratio based on the reduced image, and
wherein the display control section further performs a control to superimpose the enlarged image on the designated position in the reduced image, based on the data of the enlarged image generated by the enlarged image generation section.

(6) The image processing apparatus according to any of (1) to (5), further including:
a cursor speed setting section which sets a moving speed of a mouse cursor, based on the enlargement ratio set by the enlargement ratio setting section.

(7) The image processing apparatus according to any of (1) to (6),
wherein the cursor speed setting section sets the moving speed of the mouse cursor so that the more the enlargement ratio increases, the more the moving speed of the mouse cursor decreases.

For example, the present disclosure can be applied to an image processing apparatus displaying an image.

What is claimed is:
1. An image processing apparatus, comprising:
an enlargement ratio setting section which sets a region of data in an original image, including a designated position designated as an object to be enlarged within the original image, as a region to be enlarged, and sets an enlargement ratio to the region to be enlarged, based on an image feature amount showing complexity of an image of the region to be enlarged; and
an enlarged image generation section which generates enlarged image data for the data of the original image, by applying an enlargement process by the enlargement ratio set by the enlargement ratio setting section.

2. The image processing apparatus according to claim 1,
wherein the enlargement ratio setting section sets the enlargement ratio so that the more a value of the image feature amount increases, the more the enlargement ratio increases.

3. The image processing apparatus according to claim 2,
wherein the enlargement ratio setting section obtains, as the image feature amount, a total sum of absolute values of differences between each pixel value of a smoothed image and the original image within the region to be enlarged.

4. The image processing apparatus according to claim 2, wherein the enlargement ratio setting section calculates absolute values of differences between adjacent pixels for all pixels as the data of the original image to be processed, and obtains, as the image feature amount, a total sum of absolute values of the differences between the adjacent pixels belonging to the region to be enlarged.

5. The image processing apparatus according to claim 2, further comprising:
   a display control section which performs a control to display a reduced image of the original image, based on the data of the original image;
   wherein the enlargement ratio setting section sets the enlargement ratio based on the reduced image, and
   wherein the display control section further performs a control to superimpose the enlarged image on the designated position in the reduced image, based on the data of the enlarged image generated by the enlarged image generation section.

6. The image processing apparatus according to claim 5, further comprising:
   a cursor speed setting section which sets a moving speed of a mouse cursor, based on the enlargement ratio set by the enlargement ratio setting section.

7. The image processing apparatus according to claim 6, wherein the cursor speed setting section sets the moving speed of the mouse cursor so that the more the enlargement ratio increases, the more the moving speed of the mouse cursor decreases.

8. An image processing method of an image processing apparatus, comprising:
   setting a region of data in an original image, including a designated position designated as an object to be enlarged within the original image, as a region to be enlarged, and setting an enlargement ratio to the region to be enlarged, based on an image feature amount showing complexity of an image of the region to be enlarged; and
   generating enlarged image data for the data of the original image, by applying an enlargement process by the set enlargement ratio.

9. A non-transitory computer readable medium having stored thereon a program for causing a computer to function as:
   an enlargement ratio setting section which sets a region of data in an original image, including a designated position designated as an object to be enlarged within the original image, as a region to be enlarged, and sets an enlargement ratio to the region to be enlarged, based on an image feature amount showing complexity of an image of the region to be enlarged; and
   an enlarged image generation section which generates enlarged image data for the data of the original image, by applying an enlargement process by the enlargement ratio set by the enlargement ratio setting section.

* * * * *